Feb. 28, 1967 W. V. PIERCE 3,306,282
METHOD FOR CHARTING TEMPERATURE DEVIATIONS
Filed April 3, 1964
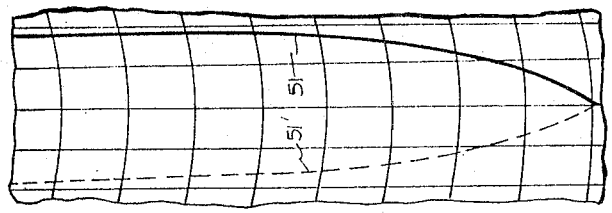
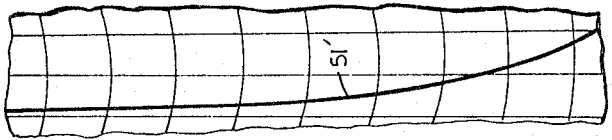
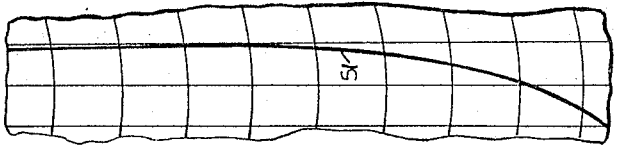
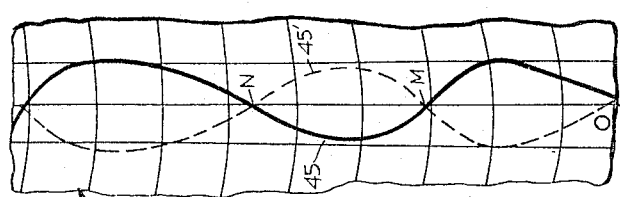
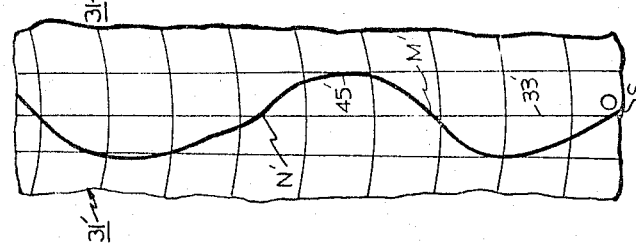
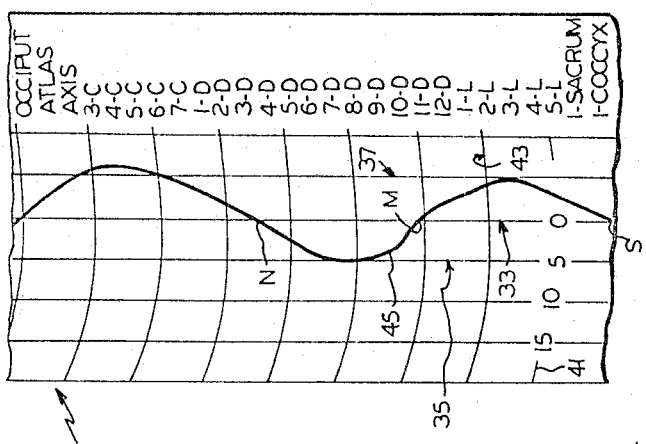
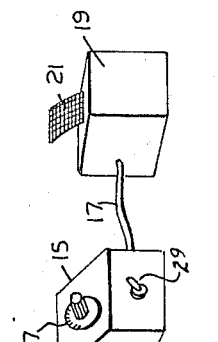
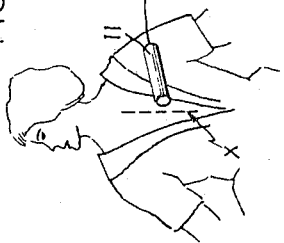
INVENTOR
WALTER V. PIERCE
BY Fisder, Christen, Sabol
and Caldwell
ATTORNEYS

United States Patent Office

3,306,282
Patented Feb. 28, 1967

3,306,282
METHOD FOR CHARTING TEMPERATURE DEVIATIONS
Walter V. Pierce, Clairton, Pa.
(209 Richland Ave., Dravosburg, Pa. 15034)
Filed Apr. 3, 1964, Ser. No. 357,186
5 Claims. (Cl. 128—2)

The present invention relates to a method for detecting temperature variations along the skin relative to an initial starting point temperature, and includes the successive development of charts of such variations, respectively reversed about the axis of the initial or starting point temperature for superposition comparison.

The invention has particular application to the measurement of temperatures along the surface of a skin of a person, and is carried out through the use of a single temperature-responsive probe adapted to be glided in contact with the skin, directly over the spinal column or portions thereof, to detect temperature deviations therealong.

The probe includes a temperature-responsive element such as a thermocouple or thermistor in electrical connection with the measuring or detection circuitry included in the instrument housing. An indicator or recorder is provided which may also be included in the housing, and a polarizing switch is connected between the measuring or detecting circuitry and the recorder, the latter being of the recorder oscillograph type capable of making a graph or strip chart.

Provision for calibration of the apparatus is made in order that a zero setting may be provided to correspond to the skin temperature of the individual patient at the starting point of the glide. Thereafter, any deviation from this zero condition will produce a chart of temperature deviations relative to the starting point temperature of a given individual.

It is known that the temperature of skin covered with clothes usually lies in the range of 75° F.–93° F., the temperature of the bare skin varies widely with environmental temperature. The exact skin temperature at various surface areas of the body is influenced by various factors. For example, the state of general health of the individual, as well as the environment, readily affect skin temperature. It is also known that inflammation or other abnormal conditions produce temperature variations. Heretofore, it has been impossible to pinpoint minute temperature deviations relative to the starting point temperature such that detailed study of specific points of interest could be facilitated. It should be noted that starting point temperatures from individual to individual for exact or similar locations vary, and such variations may be of the order of ⅓° F. It is relative to starting point temperatures detected within such accuracy that the subject method provides to chart temperature deviation therefrom. It is significant to note that the heat differentials detected and charted actually occur along the spine itself from adjacent point to adjacent point without gaps between measurements, thereby providing temperature data from minute areas directly over the column, rather than from spaced apart positions. The simultaneous charting of such data relative to the starting point temperature provides an instant record of all positions along the spinal column.

A further chart for the same area can be immediately prepared by regliding the probe up the spinal column over the same path, with the polarizing switch effective to change the polarity of the signal applied to the recorder. Superposition of the two charts then pictorially and conveniently pinpoints temperature deviations from the starting point level. On the charts, this level is calibrated at the zero or reference line, such that regions of cooler temperature produce a deflection in one direction from the reference line and regions of warmer temperatures produce a deflection in the opposite direction. When the curve crosses the zero or reference line, the operator knows that a temperature equal to the starting point temperature is encountered. Such positions may be marked with a skin pencil and appropriate treatment undertaken. X-rays or other techniques may be employed at the pinpointed locations to enable further study. Immediately following treatment, a recheck can be achieved and the charts compared to indicate the results, if any, of the treatment.

Various medical and surgical techniques have been evolved for correction of diseased or impaired conditions in the body, and it is the purpose of the subject method to locate the areas of temperature involvement. The effected point so-located may be treated by the preferred means and/or processes desired to be applied by the individual in charge of the case.

It is pointed out that, the elimination of vaso-constriction or other causes of the temperature deviations, such as cool regions encountered, will cause the skin temperature to reflect such effect by the elimination of the chart reference line crossovers. Thus, if a chiropractic adjustment of the vertebrae, in the region of involvement, is made, further charts can be immediately produced to determine whether or not a changed condition is reflected by the skin temperature.

With the foregoing in mind, it is among the objects of the present invention to provide a method for detecting temperature differentials or variations along the skin, directly over the spinal column.

It is a further object of the invention to provide a method for utilizing such temperature differentials relative to a starting point temperature for developing strip charts suitable for superposition.

It is a further object of the invention to provide a method capable of the use of a single probe temperature-responsive device for detecting temperature deviations from a selectable initial temperature.

It is a still further object of the invention to provide a method for charting temperature deviations from an initial starting point temperature oppositely on successive glides to product charts for superposition which provide information of a type heretofore unavailable.

The invention will be further described in detail in connection with the appended drawings, wherein:

FIG. 1 is a view in perspective showing a suitable instrument in application to a person;

FIGS. 2a through 2f show a series of charts recorded in connection with the application of the apparatus to the skin surface directly over the spinal column;

FIG. 2a shows a right polarized chart;

FIG. 2b shows a left polarized chart;

FIG. 2c shows the chart of FIG. 2a superimposed on the chart of FIG. 2b;

FIG. 2d and 2e show, respectively, right polarized and left polarized charts, taken immediately after effective treatment; and, FIG. 2f shows the chart of FIG. 2d superimposed on the chart of FIG. 2e.

Referring now to the drawings, and particularly to FIG. 1, there is depicted, in perspective, a suitable instrument in application to an individual to produce charts of the person's skin temperature variation along the spinal column. The apparatus comprises a single probe 11 adapted to establish temperature-responsiveness over cable 13 which extends to adapter 15; the latter includes the measuring or detecting circuitry which is electrically responsive to the temperature variation sensed.

The output signal or voltage from the adapter 15 is applied over cable 17 to a recorder 19, which in turn produces a chart 21, providing a visual indication of the temperature variation detected.

A foot switch 23 is illustrated as being conveniently deployed for use by the operator to initiate the chart drive for the recorder via lead 25 and cable 17. This switch could be included in the probe 11 for manipulation by the hand of the operator.

The adapter includes a calibration knob and dial 27 and a polarization switch 29, the latter being provided for either left or right hand polarization positions.

Separate modifications of apparatus capable of effecting the principles above outlined are disclosed in an application of Walter V. Pierce and George Suskalo, entitled Temperature-Responsive Apparatus, Serial No. 357,204, filed concurrently herewith.

In the referenced companion application, the probe 11 includes temperature responsive means, such as a thermocouple or a thermistor, in electrical connection with a measuring or detecting circuit included in adapter 15. For example, a thermistor Wheatstone bridge arrangement or a thermocouple voltage unbalancing network may readily be employed to operate the marking stylus of this invention.

The bridge circuit is balanced at the starting point temperature and deviations therefrom will indicate on the charts, as shown.

Conventional calibration techniques may be employed to balance the bridge for each individual patient's starting point skin temperature. Such a circuit may be operated from a wall socket or battery.

In the thermocouple responsive detector circuit, a standard or reference potential is provided in the form of, for example, a mercury cell with a 1.35 D.C. voltage rating. The thermocouple produces a voltage proportional to the temperature which it is sensing, which voltage is compared against the reference potential and the difference voltage is used to energize the recorder and operate the marking stylus. This circuit may also be calibrated using conventional adjusting resistors connected, for example, in parallel with the battery such that, that part of the battery voltage may be selected which is equal and opposite to the voltage produced by the thermocouple at the initial or starting point skin temperature.

In operation, the instrument is first calibrated to zero for the particular starting point temperature for the individual person. For example, if the probe glide is to be initiated from point X upwardly on the illustrated person, the probe 11 is firmly placed against the skin at point X and its temperature-responsive element influences the circuitry in adapter 15, to produce a mark on chart 21. Adjustment of dial 27 is made to cause the initial mark to appear on the chart 21, along the zero axis.

Next, the foot switch 23 is depressed to start the chart drive simultaneously with the upward gliding movement imparted to the probe 11 from point X. The gliding motion is preferably uniform, and contact with the skin is firmly and constantly maintained, as the probe 11 is caused to traverse the skin over the spinal column along the extent thereof or within the region of interest, which may comprise any portion of or the entire spinal column. Thus, the temperature variations encountered vertically, i.e. along the spinal column, are graphed on the chart 21 which is produced simultaneously therewith. The operator may mark, with a skin pencil, any positon on the patient's skin corresponding to a crossing of the zero axis by the recorder pen, if such positions are of interest for subsequent study by X-ray or other techniques.

Typical charts produced from four separate glides are illustrated in FIGS. 2a–2f. These charts will now be used in connection with the further explanation of the use of the apparatus. Strip chart paper 31 of conventional character, is preferably employed and includes the usual incremental uniform spacing lines, such as the longitudinal lines indicated by the zero axis line 33, the five unit line 35 (to the left of the zero axis line), and the five unit line 37 (to the right of the zero axis line). Transverse divisions are also provided by the arcuate, uniformly spaced, lateral lines, such as lines 41 and 43.

As may be readily seen from chart 2a, a trace or curve 45 was obtained beginning with the zero calibration point 0, which tract first deviated to the right hand side of the origin or reference line 33, then traversed the reference line 33 to the left, and returned to the right thereof to terminate approximately at the origin line 33, near the upper end of the chart. For convenience, there is lettered in the distribution of spinal vertebrae traversed while the chart was prepared. These vertebrae are identified from top to bottom as: occiput, atlas, axis, followed by the third to the seventh cervical, the first to the twelfth dorsal, the first to the fifth lumbar and the sacrum and coccyx, the latter being taken as the origin or starting point for the particular curve produced in FIGS. 2a–2f.

The significance of chart 2a (taken with the switch 29 of adapter 15, FIG. 1, in its right hand position) is that with the device calibrated to the skin temperature at the starting point s, the temperature initially increased as the probe 11 was moved upwardly, but then crossed the axis at point M to a cooler temperature region. As the probe glide was continued, the curve returned to the right hand side at point N as the temperature encountered was again equal to the starting temperature. Above point N, the temperature sensed was greater than the calibrated zero or starting point temperature.

After the chart of FIG. 2a was produced, the process was repeated with switch 29 set to its left hand position, and the chart of FIG. 2b was produced. It should be pointed out that the production of the charts with the apparatus herein described requires but a brief period of time, and that they can be successively produced without any delay.

Since the polarization employed in the production of chart 2b was opposite to that employed for the production of chart 2a, the reverse or mirror image curve 45' was generated. This curve started from the zero origin line 33' and proceeded in a direction left of the origin until it returned to the axis at point M', where it encountered a cool region which appears to the left between points M' and N'. The curve thereafter again recrossed the origin line 33', which indicated a temperature equal to, and thereafter higher than, the initial starting temperature.

Upon the completion of the charts of FIG. 2a and FIG. 2b, they were superimposed, as shown in FIG. 2c. The composite chart readily reveals the region M–N produced by the probe when it encountered cooler temperatures than the calibration temperature. The superimposition, not only conveniently locates this region of interest, but also serves to balance out irregularities or non-symmetrical conditions encountered in producing the charts.

What is claimed is:

1. A method for charting, using a temperature responsive device having a recording stylus, calibration means, and a probe with a single sensing end, on paper having a center line, skin temperature variations existing along the spinal column comprising the steps of: placing the sensing end of the probe in contact with the individual patient's skin at a starting point; calibrating the device to place the stylus on the center line when sensing the starting point temperature; and gliding the probe sensing end over the surface of the skin vertically from the starting point in the area of the spinal column while advancing the chart paper to produce a chart showing only temperature deviation along the single glide path relative to the starting point temperature with temperatures above the calibration temperature being charted to one side of the center line and temperatures below the calibration temperature being charted to the other side of the center line.

2. The method of claim 1, in which the device employs a bridge circuit with a temperature responsive means in said end of the probe as an arm in the bridge circuit; wherein: calibration is carried out by adjusting the bridge circuit to a balanced condition with zero output when sensing the skin temperature at the starting point.

3. The method of claim 1 in which the device includes an adjustable voltage source and a voltage producing temperature responsive means in said end of the probe for comparison of the probe voltage to that of the adjustable source with the stylus being responsive to any difference voltage between that of the temperature responsive means and the source; wherein: calibration is carried out by adjusting the source voltage to equal that of the temperature responsive means when sensing the skin temperature at the starting point.

4. The method of claim 2, in which, the output of the bridge circuit is used to drive the stylus; wherein: said first chart is made with the bridge output applied to the stylus in one polarization connection and reversing the polarization connection to produce a second chart by repeating the aforementioned steps with the bridge output applied to the stylus in the opposite polarization connection.

5. The method of claim 3, in which the difference voltage is used to drive the stylus; wherein: said chart is made with the difference voltage applied to the stylus in one polarization connection and reversing the polarization connection to produce a second chart by repeating the aforementioned steps with the difference voltage applied to the stylus in the opposite polarization connection.

References Cited by the Examiner

UNITED STATES PATENTS

| | | | |
|---|---|---|---|
| 1,552,284 | 9/1925 | Evins | 128—2 |
| 2,111,677 | 3/1938 | Robinson | 128—2 |
| 2,161,370 | 6/1939 | Mears | 128—2.1 |
| 2,546,275 | 3/1951 | Redding | 128—2.1 |
| 2,888,918 | 6/1959 | Pierce et al. | 128—2 |
| 3,067,931 | 12/1962 | Mosse | 235—61 |

ROBERT E. MORGAN, *Acting Primary Examiner.*

RICHARD A. GAUDET, *Examiner.*

W. E. KAMM, *Assistant Examiner.*